US012292323B2

(12) United States Patent
Jach et al.

(10) Patent No.: US 12,292,323 B2
(45) Date of Patent: May 6, 2025

(54) WEIGHING PLATFORM WITH A LATTICED LOAD-BEARING STRUCTURE

(71) Applicant: Megaterm Plus Spolka z Ograniczona Odpowiedzialnoscia, Kielce (PL)

(72) Inventors: Marek Jach, Kielce (PL); Piotr Zach, Warsaw (PL)

(73) Assignee: Megaterm Plus Spolka z Ograniczona Odpowiedzialnoscia, Kielce (PL)

( * ) Notice: Subject to any disclaimer, the term of this patent is extended or adjusted under 35 U.S.C. 154(b) by 0 days.

(21) Appl. No.: 18/543,713

(22) Filed: Dec. 18, 2023

(65) Prior Publication Data

US 2024/0142297 A1 May 2, 2024

Related U.S. Application Data

(63) Continuation of application No. 17/041,615, filed as application No. PCT/PL2019/000022 on Mar. 26, 2019, now Pat. No. 11,892,341.

(30) Foreign Application Priority Data

Mar. 28, 2018 (PL) .......................................... 425073

(51) Int. Cl.
*G01G 21/22* (2006.01)
*E04C 2/42* (2006.01)
(Continued)

(52) U.S. Cl.
CPC .............. *G01G 21/22* (2013.01); *E04C 2/423* (2013.01); *G01G 9/005* (2013.01); *G01G 19/02* (2013.01)

(58) Field of Classification Search
CPC ...... G01G 19/02–19/027; G01G 9/005; G01G 21/22; E04C 2/423; E04C 2/425
See application file for complete search history.

(56) References Cited

U.S. PATENT DOCUMENTS 1,158,154 A * 10/1915 Albree .................... E04C 2/423
29/897.15
2,241,952 A * 5/1941 Lachman ................ E04C 2/423
428/116
(Continued)

FOREIGN PATENT DOCUMENTS

CN 204924416 U 12/2015
CN 107817039 A 3/2018
(Continued)

OTHER PUBLICATIONS

International Search Report issued by the European Patent Office for International Patent Application No. PCT/PL2019/000022, date of mailing Jul. 22, 2019.

*Primary Examiner* — Randy W Gibson
(74) *Attorney, Agent, or Firm* — Myers Wolin, LLC (57) ABSTRACT

A weighing platform with a lattice load-bearing structure shaped spatially and made of load-bearing elements and connecting elements intersecting with them, affixed to a joint frame, where the load-bearing elements, in the place of intersection with the connecting profiles, have cuts in the shape adjusted to the shape of the connecting elements, and additionally the platform contains at least one load-bearing shell, measurement elements, regulated feet and connectors, where the connecting elements are located strictly in the cuts of the load-bearing structure at the depth, equal to height of the connecting elements and at the same time less than half of the height of the load-bearing elements, while to the bottom of the weighing platform at least two profile panels are fixed, with openings for the screw connectors, to which panels the measurement elements and regulated feet are fixed.

1 Claim, 11 Drawing Sheets

(51) Int. Cl.
  *G01G 9/00* (2006.01)
  *G01G 19/02* (2006.01)

(56) References Cited

U.S. PATENT DOCUMENTS

| | | |
|---|---|---|
| 4,453,606 A | 6/1984 | Mokhbery et al. |
| 11,892,341 B2 * | 2/2024 | Jach ................ G01G 21/22 |
| 2015/0153218 A1 | 6/2015 | Savage et al. |

FOREIGN PATENT DOCUMENTS

| | | |
|---|---|---|
| EP | 0897104 A1 | 2/1999 |
| PL | 224932 B1 | 2/2017 |

\* cited by examiner

WEIGHING PLATFORM WITH A LATTICED LOAD-BEARING STRUCTURE

CROSS REFERENCE TO RELATED APPLICATIONS

This application is a continuation of and claims the benefit of the U.S. patent application Ser. No. 17/041,615, filed on Sep. 25, 2020, titled "Weighing Platform with a Latticed Load-Bearing Structure", which was filed in US on Mar. 26, 2019 as entry into the national phase of the international application no. PCT/PL2019/000022, where both applications claim priority to Polish Patent Application P425073, filed on Mar. 28, 2018, the contents of each of which are incorporated by reference in their entirety in the present application for all purposes.

BACKGROUND OF THE INVENTION

The subject matter of the solution is a weighing platform with a latticed load-bearing structure, intended for use in industrial weighing devices, especially the weighing devices, in case of which, apart from high measurement accuracy, a high load-bearing capacity is required.

Traditional weighing platforms intended for high loads usually take the form of a latticed load-bearing structures, connected to the concrete. Such structures are sturdy and heavy, thus they are immovable. It is also difficult to apply in their case the new measuring techniques increasing the weighing accuracy. Patent PL 224932 includes an attempt at reduction of the weight of a weighing platform by executing empty spaces in concrete and filling them with a lighter material. However, this solution did not reduce the weight of the weighing platform to an extent allowing it to be a movable platform. The weight of the structure is a key criterion of usability and applicability. In case of stationary types the assembly of platforms is problematic as it is onerous, time-consuming and expensive; in case of mobile solutions, the weight of a structure disqualifies a solution as mobile, due to inconsistency with the assumptions.

Industrial weighing platforms with smaller parameters are also known; their load-bearing structure takes the form of a flat latticed structure, welded from bars or profiles, covered with a load-bearing shell on the top. The measurement elements in the fount of a system of tensometric beams are fixed to the latticed structure. Such structures are presented for example in the patent application US2015/153218 (A1) and in the description of the utility model CN204924416 (U).

The disadvantage of the above presented weighing platforms is their load-bearing structure which is not very sturdy, but complicated to execute; its elements are usually combined with each other by means of heat bonding or manual welding. Too little sturdiness of the latticed structure, the fixing system of the measurement elements which is not adjusted to transmit high loads, and an uneven stress level of the structure do not allow for application of a solution for weighing heavy loads, and additionally execution of platforms of large active area of a load-bearing slab is problematic.

The welding or heat bonding technology requires observation of strict rules in order to obtain the assumed results of the structure operation. In the welding or heat bonding process, high local concentration of stress is introduced in the structure due to heat processes, which translates into quality of execution of the structure, repeatability of properties and durability, and additionally the mutual geometric relations between the profile elements, as well as failure-free exploitation and resistance to corrosion factors.

In case of weighing structures, the quality of execution of a structure using the welding or heat bonding technology is very important for an even transmission of loads, and thus measurement accuracy. Load-bearing structures of industrial scales of large dimensions are usually made for unit orders or in small batches. Because of that the operations consisting in joining individual latticed elements are not executed on production plants with the use of welding machines, but manually. Such a technology results in production errors in the welded or heat-bonded load-bearing structures; their execution tolerance is random, which has a crucial impact on the usability of the device.

It should also be emphasised that the load-bearing elements of measuring frames of the weighing platforms are also made of stainless steel and steel resistant to acid, apart from traditional steel. Execution of a structure from the above mentioned materials requires special and more expensive machining.

Another disadvantage of the structures executed by means of manual welding or heat bonding is high consumption of labour, energy and materials. Additionally, there are installation problems while executing a load-bearing latticed structure and problems with ensuring repeatability of production.

This problem was partly eliminated in patent application EP0897104, which presents a weighing platform with spatial latticed structure, made of merging load-bearing and connecting elements, whereas in each load-bearing element and in each connecting elements, in the connection points there are vertical cuts through which the load-bearing elements and connecting elements merge, whereas the latticed load-bearing structure is connected to the load-bearing shell through the connecting elements. However, this solution increases the costs of materials and the weight of the structure.

SUMMARY OF THE INVENTION

The purpose of the solution is to develop a weighing platform with a latticed structure, the geometry of which will be adjusted to the manner of realisation of the measurement and scope of loads, which will ensure accurate and repeatable measurement which does not change in time, regardless of the load-carrying capacity of the scales. The purpose is also to facilitate the assembly of the industrial scales and possibly replace the damaged measurement devices as well as to increase the resistance of the platform to corrosion factors of the environment and working surroundings of the weighing platform. The purpose is also to reduce the costs and weight of the weighing platform.

The weighing platform with a latticed load-bearing structure shaped spatially and made of load-bearing elements and connecting elements intersecting with them, affixed to a joint frame, whereas the load-bearing elements, in the place of intersection with the connecting profiles, have cuts in the shape adjusted to the shape of the connecting elements, and additionally the platform contains at least one load-bearing shell, measurement elements, regulated feet and connectors, according to the disclosure is characterised by the fact that the connecting elements are located strictly in the cuts of the load-bearing structure at the depth "g", equal to height "h" of the connecting elements and at the same time less than half of the height "H" of the load-bearing elements, while to the bottom of the weighing platform at least two profile panels are fixed, with openings for screws of the screw connectors, to which panels the measurement elements and regulated feet are fixed. Preferably, the load-bearing elements are flat, T-shaped or C-shaped profiles. Similarly, the connecting elements may be flat, T-shaped or C-shaped profiles or bars with a round and rectangular cross-sections. Preferable profile panels are open or closed channel profiles. The profile panels may be situated parallelly or perpendicularly to each other. Preferably, load-bearing elements and connecting elements are protected with an anti-corrosion coating. Preferably, the load-bearing shell is additionally covered with a cover. Preferably, the measurement elements are the optoelectronic measurement systems or beam measurement systems with the application of tensometric beams or polymeric measurement beams.

According to the disclosure, thanks to the latticed load-bearing structure shaped spatially, the solution is characterised by high sturdiness and strength. The structure of the latticed load-bearing structure and detachable connection of the other elements of the platform, significantly reduces the installation time. The latticed load-bearing structure may be executed using the press, welding or automatic heat-bonding technology, depending on the required load-bearing parameters, which technology solves the problems connected with manual welding. The latticed load-bearing structures welded or heat-bonded at manufacturing plants and executed on machines are not prone to execution errors on individual welds or bonds, which has a significant impact on the quality of execution and measurement accuracy. Such latticed load-bearing structures may also feature a protection against corrosion executed at the plant, which increases their life span and exploitation durability. Increased resistance of corrosion factors will allow to apply such weighing devices in the food and chemical industry. Unexpectedly, it turned out that the solution is very universal, so that it may be applied for weighing devices of diverse load-bearing capacity. It is enough to select the relevant parameters of the latticed load-bearing structure, load-bearing shell, profile panels and related devices. Such parameters may be selected on a computer with the use of well-known design software. According to the solution, the weighing platform is not limited as to the type of material from which the latticed load-bearing structure and load-bearing shell is made of, provided that relevant durability and sturdiness is maintained. Therefore, it is possible to execute a latticed load-bearing structure and load-bearing shell, depending on the applied technology and desired usable conditions, from structural steel, stainless steel, resistant to acid, aluminium, i.a. using the pressing technology (press fitting) or combination of those materials. Application of the connecting elements of smaller height than the load-bearing elements will bring material savings while the required sturdiness and durability parameters are maintained.

Application of profile panels of the dimension adjusted to the dimension of the weighing platforms will have a positive impact on the stress level of weight and guarantee full sturdiness of the structure in the entire cross-section. At the same time, the location of measurement and installation elements in one profile panel will highly reduce the platform installation time. The channel-shaped profile panels will additionally protect the measurement and installation elements against damage.

BRIEF DESCRIPTION OF THE SEVERAL VIEWS OF THE DRAWING

The solution in accordance with the disclosure is presented in the drawing, where FIG. 10 presents a fragment of a lattice load-bearing structure made of C-shaped and flat profiles, while

The example of execution presents a weighing platform with a latticed load-bearing structure which consists of a load-bearing shell 1, lattice structure 2, two profile panels 3, measurement elements 4, regulated feet 5 and connectors 6. The latticed structure 2 consists of two load-bearing elements 7, and connecting elements 8, which are intersecting and their ends are fixed to the joint frame 9. The load-bearing shell 1 is a uniform steel shell. In a different variant the load-bearing shell 1 may be divided. It may also be made of another material, for example aluminium or composite. The load-bearing elements are flat profiles, whereas in the latticed structure 2 the shorter sides of those flat profiles are placed perpendicularly to the plain of the load-bearing shell 1. Along the upper edge of the load-bearing elements 7 placed in such a manner, there are cuts 7.1 executed at distances. The spacing of cuts 7.1 depends on the density of placement of the connecting elements 8. The cuts are placed at the depth "g" equal to the height "h" of the connecting elements 8 less than half of the height "H" of the load-bearing elements 7 and adjusted to the width and shape of the connecting profile 8, which allows for press fitting those elements with each other at the points of intersection and ensured proper sturdiness of the structure. The connecting profiles 8 are round bars. At the bottom of the structure 2, near the opposite sides of the frame 9, two C-shaped profile panels 3 are installed with their arms in the direction towards the ground. Each profile panel 3 features two openings 10 for regulated feet 5 and openings 11 for screw connectors 6, whereas the nut 6.1 of connectors 6 are fixed to the load-bearing shell 1. The measurement elements 4 are fixed to the channel profiles 3, which elements in various execution variants may be optoelectronic measurement systems or beam measurement systems with the application of tensometric beams or polymeric measurement beams. In the load-bearing shell 1 there are openings 12 for regulation of the positioning of feet 5.

Figure 11:
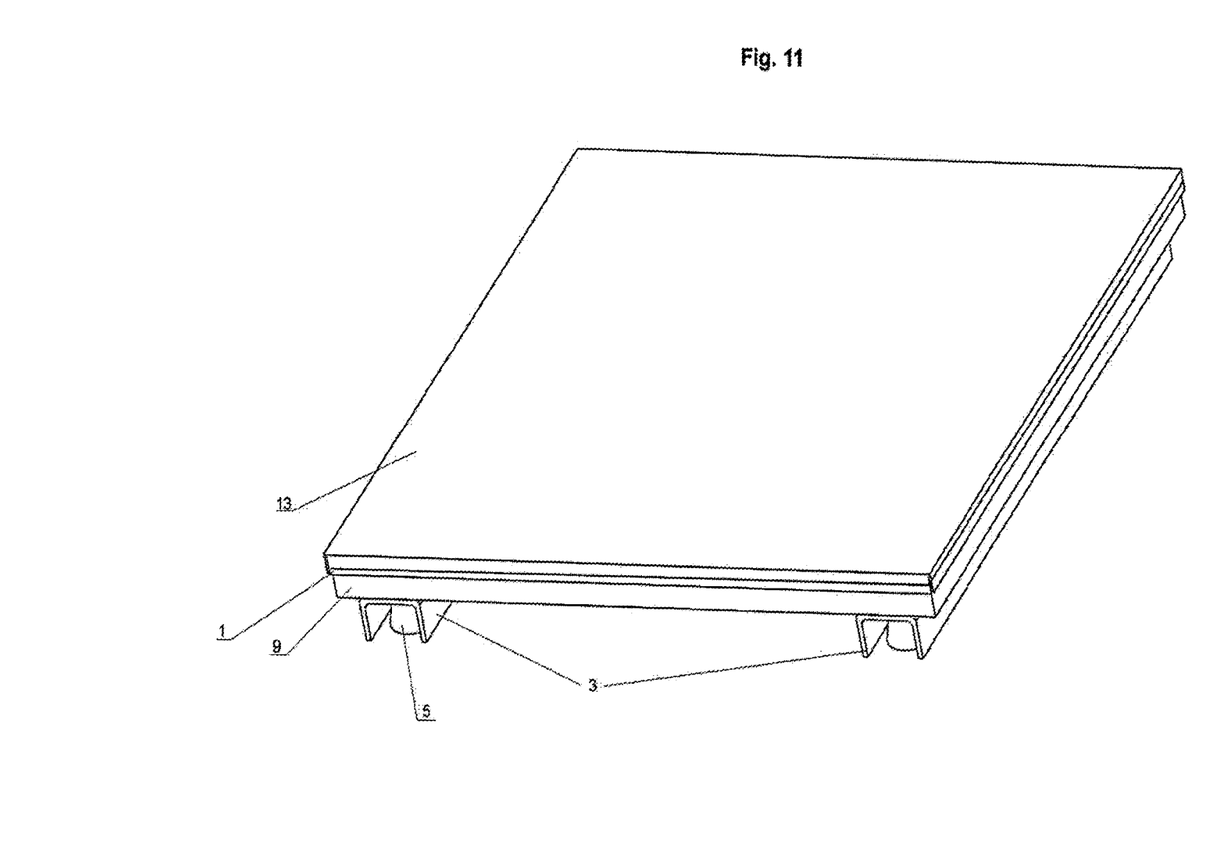
FIG. 11 presents the view of the platform from the top with a cover.

In the next execution example the weighing platform, just as in the first example, may be equipped with a covering 13 place on top of the load-bearing shell 1.

In other execution examples the weighing platform may be a combination of the possible variants, that is:
 the profile panels 3 may be C-shaped profiles with open arms or they may be closed.
 the profile panels 3 may be situated perpendicularly to each other.
 the load-bearing elements may be T-shaped or C-shaped profiles.
 the connecting profiles may be flat, T-shaped or C-shaped.
 the load-bearing structure may be made of steel or aluminium.

Figure 1:
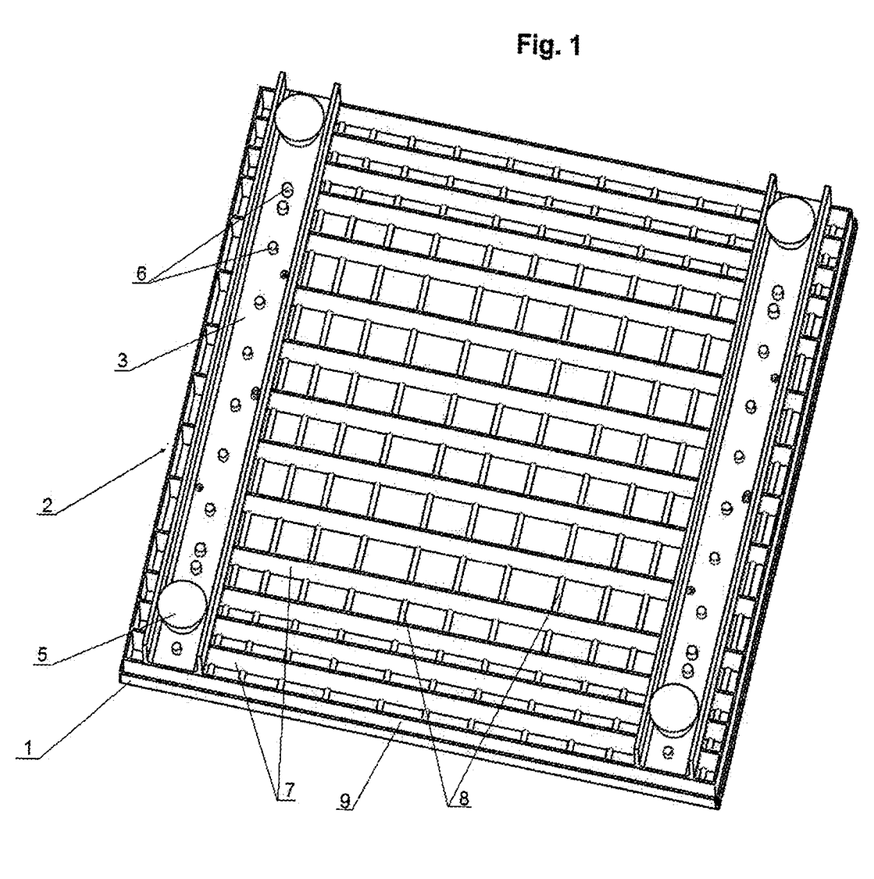
FIG. 1 presents the weighing platform in the perspective view, from the bottom.
Figure 2:
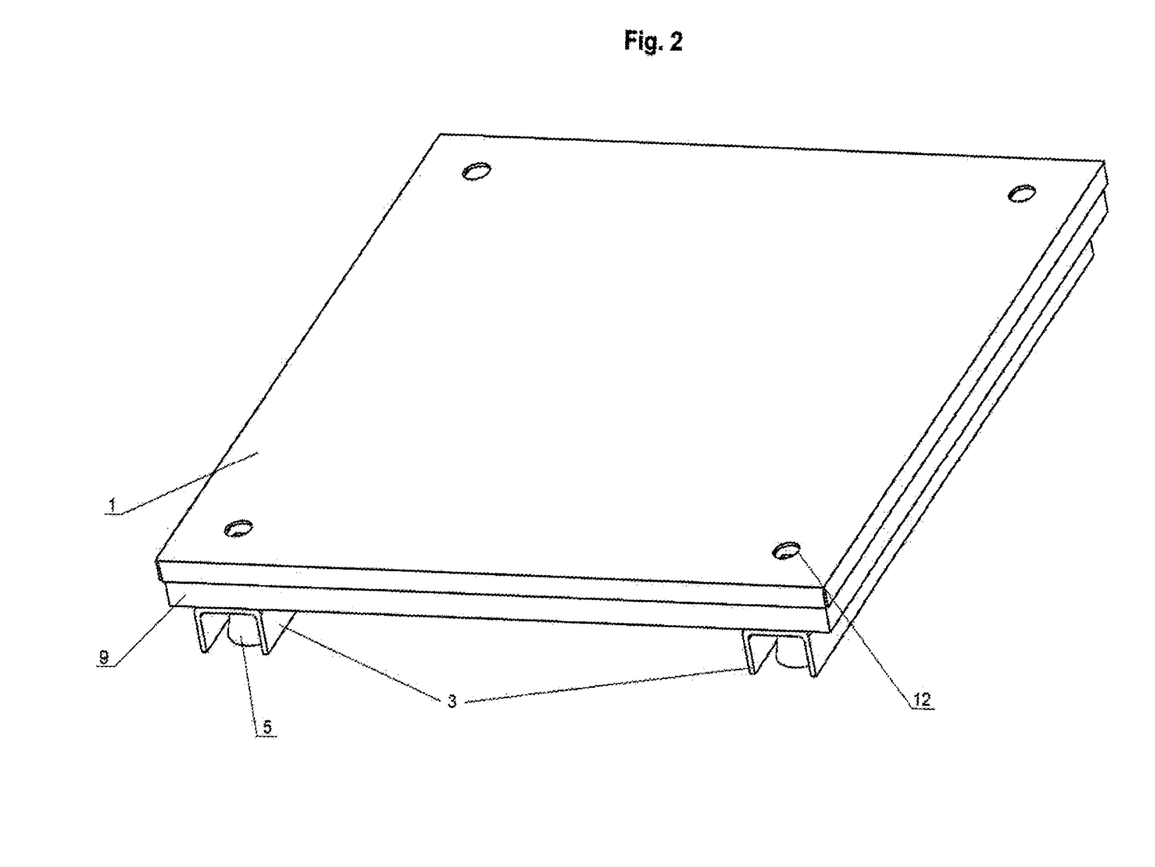
FIG. 2 presents the same platform in the view from the top.
Figure 3:
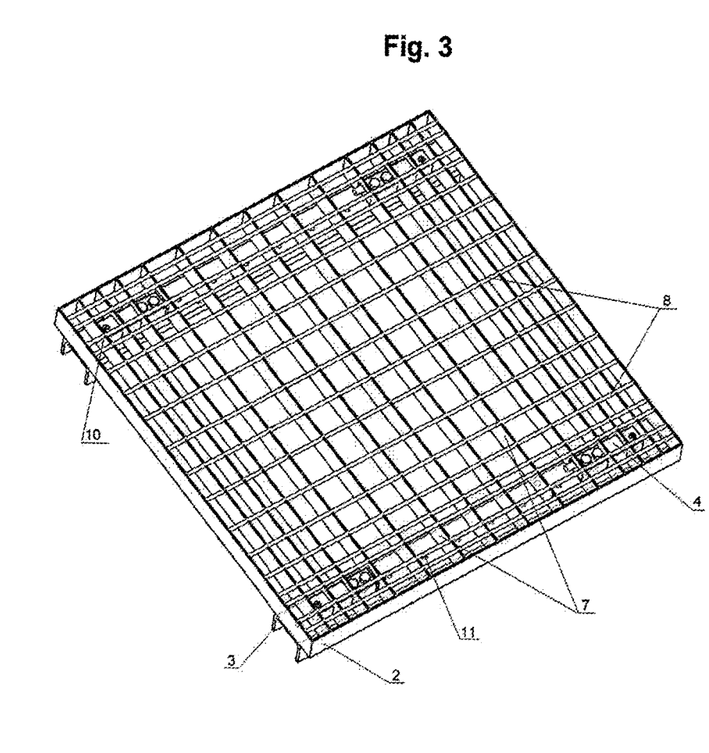
FIG. 3 presents the view from of the load-bearing latticed structure with the installed profile panels.
Figure 4:
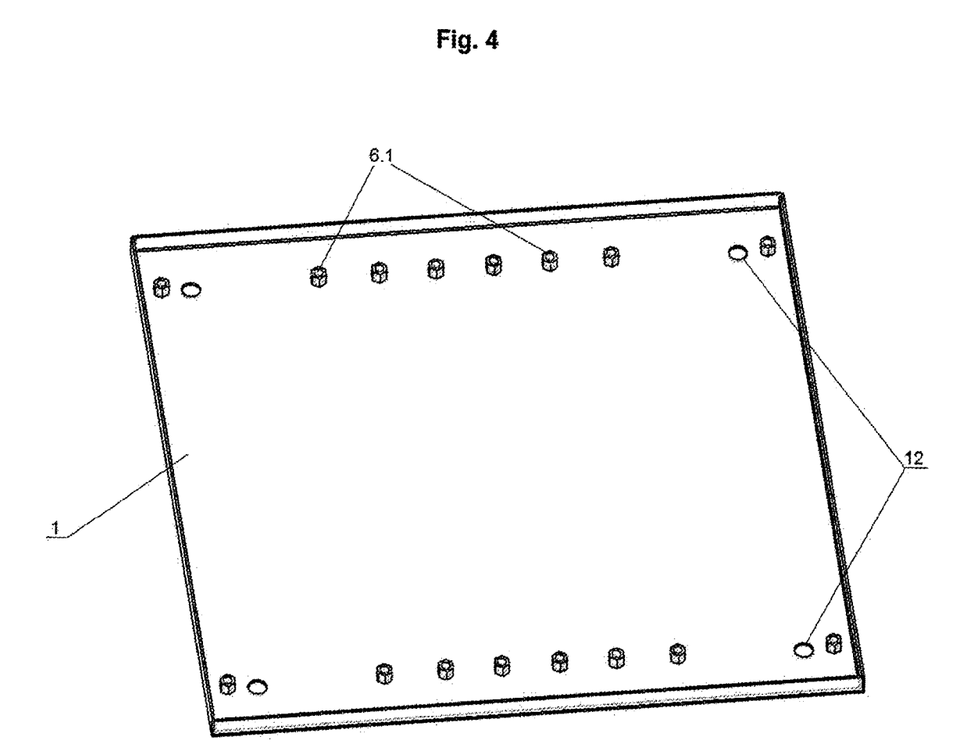
FIG. 4 presents the load-bearing shell in the view from the bottom with the installed nuts.
Figure 5:
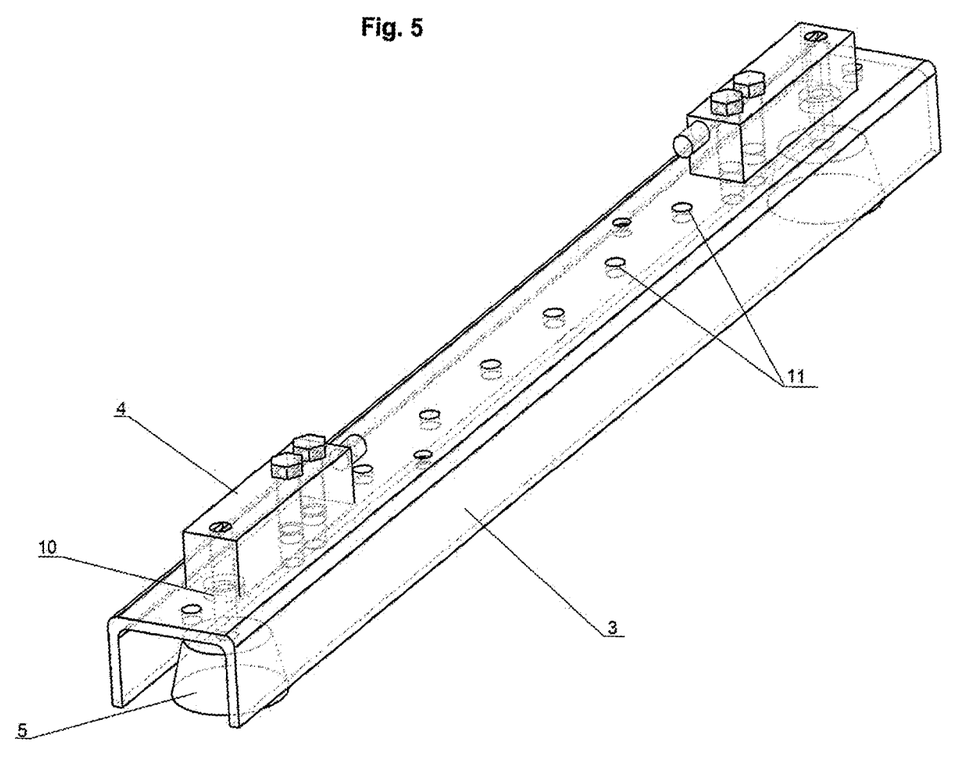
FIG. 5 presents the profile panel with the measurement elements installed on the top.
Figure 6:
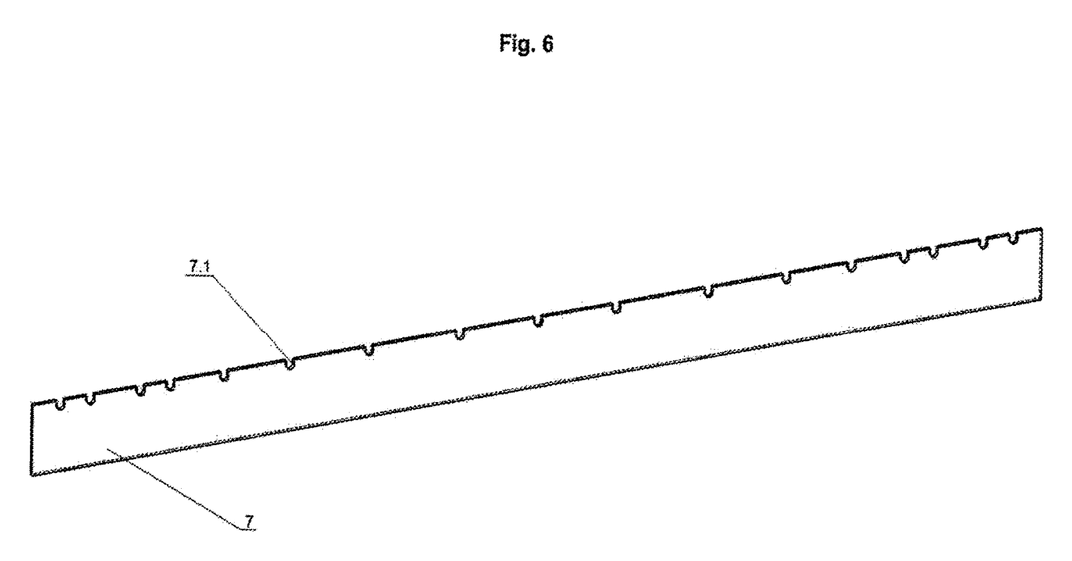
FIG. 6 presents a flat load-bearing element of the latticed load-bearing structure.
Figure 7:
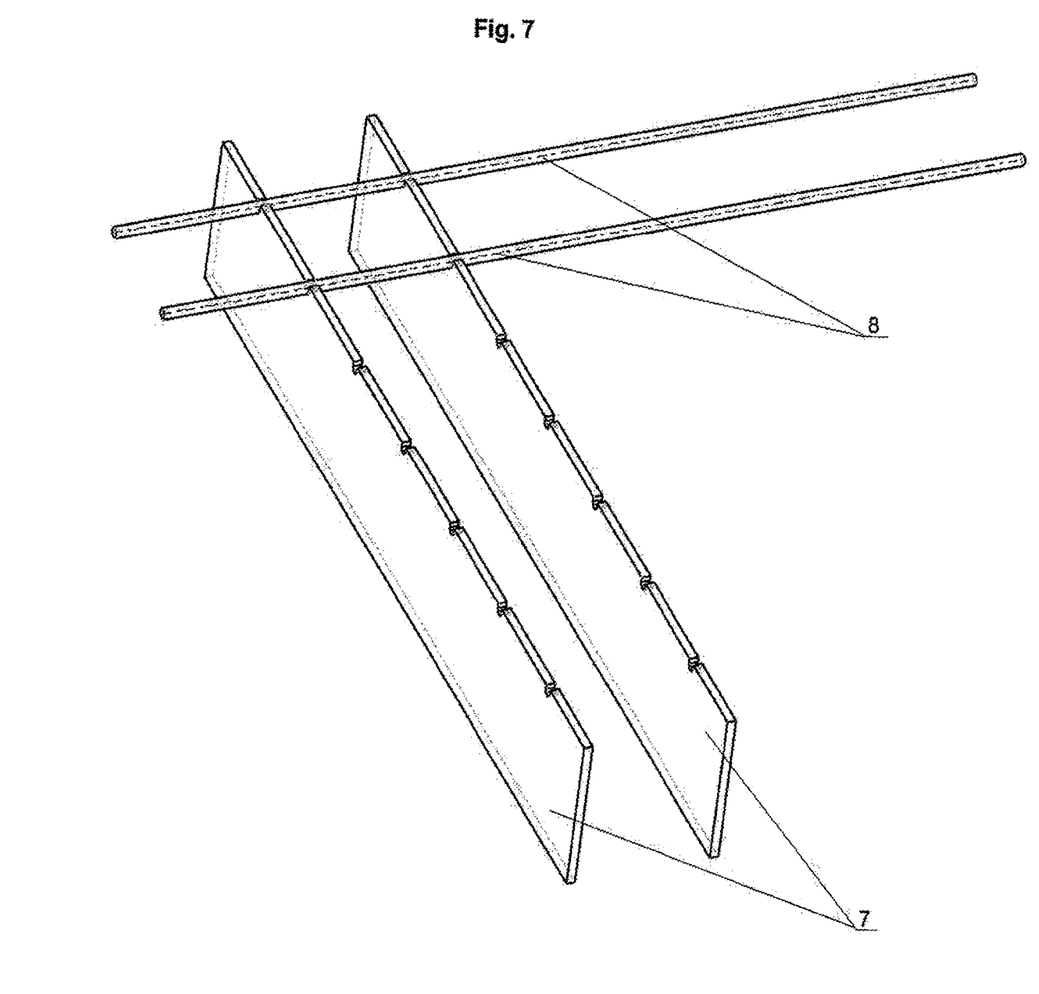
FIG. 7 presents a fragment of a lattice load-bearing structure made of flat profiles and boards.
Figure 8:
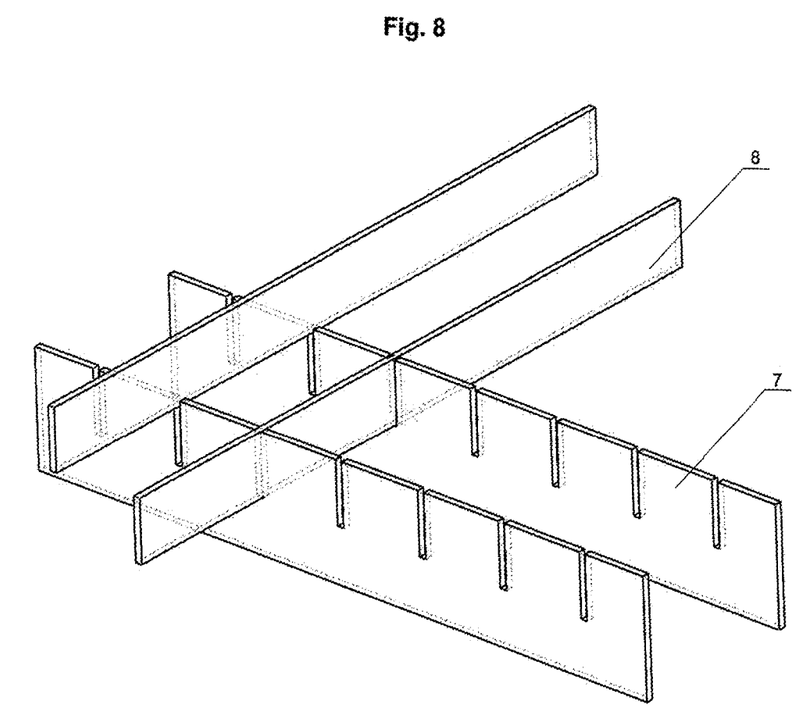
FIG. 8 presents a fragment of a lattice load-bearing structure made of flat profiles.
Figure 9:
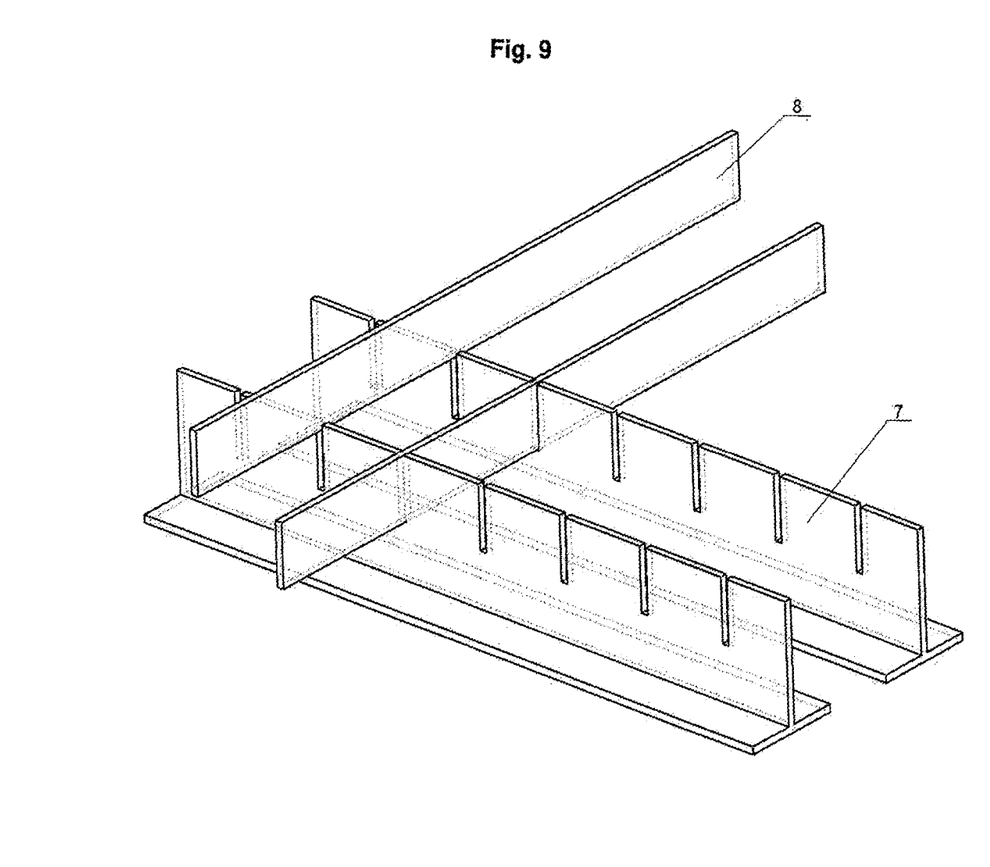
FIG. 9 presents a fragment of a latticed load-bearing structure made of T-shaped and flat profiles.
Figure 10:
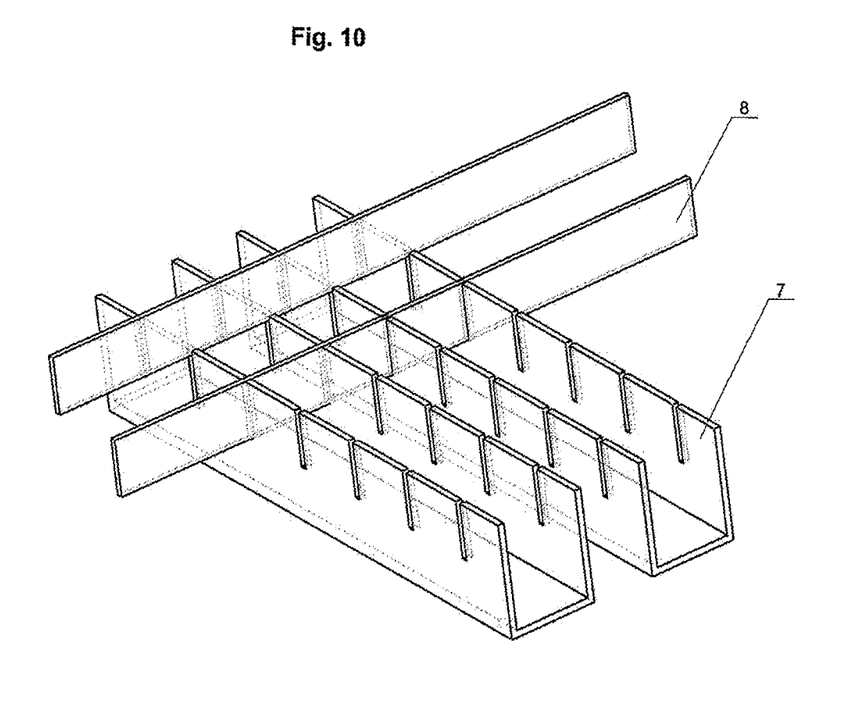

The described latticed load-bearing structure 2 constitutes a separate elements of the weighing platform and it may be executed at a plant. Joining of the load-bearing elements 7 with the connecting elements 8 into one latticed structure may be executed by means of press fitting or it may be additionally reinforced in case of larger structures by means of welding or heat-bonding on a machine. In the manufacturing process the load-bearing elements 7 and the connecting elements 8 made of steel profiles are additionally protected with an anti-corrosion coating. By means of a computer software the location of installation of the profile panels 3 with measurement elements 4 are determined.

The invention claimed is:

1. A weighing platform comprising:
    a lattice load-bearing structure shaped spatially including load-bearing elements having a height "H" and connecting elements intersecting with the load-bearing elements, at least one of the load-bearing elements and the connecting elements are affixed to a joint frame, and
    a measurement element configured to measure a load on the lattice load-bearing structure, whereas
    of the load-bearing elements and the connecting elements only the load-bearing elements, have cuts in a shape adjusted to a shape of the connecting elements, the cuts in the load-bearing elements are along an upper edge and at a depth "g" and configured for placement of the connecting elements, wherein
    the connecting elements are located strictly in the cuts of the load-bearing elements at the depth "g", the depth "g" equal to height "h" of the connecting elements and at the same time the depth "g" is less than half of the height "H" of the load-bearing elements.

* * * * *